United States Patent [19]

Knoll et al.

[11] Patent Number: 5,795,938
[45] Date of Patent: Aug. 18, 1998

[54] PREPARATION OF TOUGHENED POLYSTYRENE MOLDING MATERIALS

[75] Inventors: Konrad Knoll, Ludwigshafen; Wolfgang Loth, Bad Dürkheim; Wolfgang Fischer, Ludwigshafen; Hermann Gausepohl, Mutterstadt, all of Germany

[73] Assignee: BASF Aktiengesellschaft, Ludwigshafen, Germany

[21] Appl. No.: 849,894

[22] PCT Filed: Dec. 7, 1995

[86] PCT No.: PCT/EP95/04809

§ 371 Date: Jun. 16, 1997

§ 102(e) Date: Jun. 16, 1997

[87] PCT Pub. No.: WO96/18682

PCT Pub. Date: Jun. 20, 1996

[30] Foreign Application Priority Data

Dec. 17, 1994 [DE] Germany .......... 44 45 141.5

[51] Int. Cl.$^6$ .......... C08L 53/02; C08L 25/06
[52] U.S. Cl. .......... 525/98; 525/53; 525/95; 525/194; 525/197; 525/198; 528/501
[58] Field of Search .......... 525/95, 98, 53, 525/192, 194, 197, 198; 528/501

[56] References Cited

U.S. PATENT DOCUMENTS

| | | | |
|---|---|---|---|
| 3,429,951 | 2/1969 | Childers | 525/98 |
| 3,790,547 | 2/1974 | Muller | 260/93.5 |
| 3,903,202 | 9/1975 | Carter et al. | 260/880 |
| 4,073,831 | 2/1978 | Tabana et al. | 525/98 |
| 4,173,597 | 11/1979 | Willcox et al. | 525/98 |
| 4,239,859 | 12/1980 | Miller | 525/98 |
| 4,525,532 | 6/1985 | Tung et al. | 525/98 |
| 5,036,130 | 7/1991 | Walter et al. | 524/505 |
| 5,185,400 | 2/1993 | Farrar, Jr. et al. | 525/98 |

FOREIGN PATENT DOCUMENTS

| | | |
|---|---|---|
| 341 620 | 11/1989 | European Pat. Off. . |
| 2146581 | 3/1973 | France . |

OTHER PUBLICATIONS

*Chem. Abst.*, 119:271931, Pridy et al., Polym. React. Eng. (1993), 1(2), 343–356.
*Chem. Abst.*, 119:96777, Michaeli et al., Adv. Polym. technol. (1993) 12(1), 25–33.

Primary Examiner—Fred Teskin
Attorney, Agent, or Firm—Keil & Weinkauf

[57] ABSTRACT

Toughened vinyl aromatic compounds, in particular high impact polystyrene, are prepared by a continuous process in which the vinyl aromatic compound and the impact modifier, an elastomeric block copolymer, are each prepared separately in a reaction zone by anionic polymerization, with or without heat exchange with the environment and, if required, with the addition of a solvent, and are polymerized until complete conversion is achieved, and the living chain ends are terminated in a manner known per se, and a thermoplastic, toughened molding material is based on a vinyl aromatic compound having a residual content of less than 50 ppm of monomers and less than 100 ppm of oligomers.

8 Claims, No Drawings

PREPARATION OF TOUGHENED POLYSTYRENE MOLDING MATERIALS

The present invention relates to toughened molding materials based on polymers of styrene and other vinyl aromatic compounds, which have a particularly low content of low molecular weight byproducts and residual monomers, and to a process for their preparation based on anionic polymerization. Molding materials having a residual monomer content of less than 50 ppm, in particular less than 10 ppm, and containing not more than 10 ppm of oligomers having molecular weights of less than 1000 are preferably obtained.

In the description below, the term styrene is used even when other vinyl aromatic compounds are suitable; the present invention can of course equally be applied to molding materials comprising derivatives of styrene, such as alpha-methylstyrene, 2-, 3- or 4-methylstyrene, tert-butylstyrene, 1,1-diphenylethylene or mixtures thereof.

High impact polystyrene (HIPS) has been produced industrially to date exclusively by free radical polymerization of styrene in the presence of a dissolved rubber, the rubber itself being the starting point of living styrene chains (grafting; cf. DE-A-40 46 718; U.S. Pat. No. 3,903,202) and thus being compatible with the styrene homopolymers. The processes usually employed in industry are very expensive and are usually carried out in a plurality of reaction apparatuses in succession, for example in a 2-kettle 2-tower cascade or in a 3-tower cascade according to the above documents. Furthermore, the use of horizontal reactors (DE-A-24 44 650) has already been proposed.

All free radical polymerization processes have the disadvantage that the polymerization is incomplete and relatively large amounts of oligomers are formed as byproducts and have to be separated off together with the residual monomers after the polymerization in an expensive purification process, since especially monomeric styrene, owing to its strong odor, cannot remain in the prepared molding material. A residual content of from about 100 to 200 ppm of styrene has to date been accepted as unavoidable.

It is known that styrene can be subjected to anionic polymerization (EP-A-176 611; U.S. Pat. No. 3,035,033; FR-A-2 146 581), it being possible to carry out polymerization to virtually complete conversion. A recent overview of the anionic polymerization of, in particular, styrene is given by Priddy (J. Polym. eng. 10 (1991), 334).

In the known anionic polymerization processes, however, only polymers which are not toughened can be prepared: since no grafting of the rubber present takes place in the anionic polymerization, the rubber cannot enter into any interactions with the surrounding styrene homopolymer (the matrix), and only products having entire inadequate mechanical properties are obtained.

It is an object of the present invention, therefore, to find a process for continuous preparation of toughened molding materials based on polystyrene which comprise, in a matrix of the styrene homopolymer, an elastomeric styrene-butadiene block copolymer, the target proportion of butadiene in the styrene-butadiene block copolymer being from 15 to 80% by weight and in the molding material as a whole being from 2 to 50% by weight.

It is a particular object of the present invention to prepare toughened molding materials based on polystyrene and having only a low content of residual monomers and oligomers and high thermal stability and good mechanical properties, which molding materials are at least equivalent to the corresponding molding materials obtained by free radical polymerization.

The novel process essentially comprises the following:

styrene is subjected to anionic polymerization in a first reaction zone (I) without heat exchange with the environment and, if required, with the addition of a solvent, until complete conversion is achieved, and the living chain ends are terminated in a manner known per se;

in a second reaction zone (II) operated parallel to the first one, styrene and butadiene are subjected to isothermal anionic polymerization with the use of a suitable solvent, likewise to complete conversion, to give an elastomeric block copolymer whose living chain ends are terminated with a proton-active substance either immediately or after appropriate coupling by means of a polyfunctional compound;

the two polymer streams are combined in a mixing zone (III) and together freed from solvent and volatile components in a further zone (devolatilization zone).

It is understood that the novel process is, in particular, operated continuously.

The chosen ratio of the reactants from reaction zones I and II is preferably such that the molding material ultimately contains from 4 to 25% by weight of polybutadiene.

Preference is likewise given to a process variant in which mixtures of polybutadiene and styrene-butadiene block copolymer are prepared in reaction zone II.

The principle of the process is as follows. Two reaction apparatuses or zones I and II operated in parallel are present, zone I being operated essentially adiabatically, ie. with heating by means of the liberated enthalpy of reaction and without substantial heat exchange with the environment, and zone II being operated essentially isothermally, ie. with cooling and removal of the enthalpy of reaction liberated there. Two polymer streams are produced by an anionic method in these zones and are combined in a mixing zone III. In the adiabatically operated zone I, only styrene (or alpha-methylstyrene etc.) is polymerized, the polymers thereof being intended to form the matrix of the molding material to be prepared. In zone II, the rubber (the soft component), ie. the diene-containing polymer, is prepared. The local addition of monomers and solvent-may vary and depends on the desired molecular weight distribution and on the intended chemical composition. Mixing is effected above the phase inversion point, ie. the combined streams are not homogeneously miscible with one another. With regard to the terms phase inversion and phase inversion point, reference may be made to Angew. Makrom. Chem. 58/59 (1977), 175. Before the polymer streams from zones I and II enter the mixing zone, the living chain ends are advantageously terminated by means of proton-active substances.

Each of the reaction zones I and II may consist of one or more stirred kettles, tower reactors or other apparatuses having mechanical stirring elements (for example, loop or circulation reactors) or advantageously also of static apparatuses, such s tube reactors, with or without appropriate baffles. Whether a plurality of relatively small tube reactors connected in series or whether large individual apparatuses are used is unimportant. The necessity of baffles (static mixers) then depends on the viscosity of the reaction mixture and accordingly on the level of heat exchange with the tube wall.

Reaction zone I

The tube reactors in which styrene and, separately therefrom, initiator, the latter advantageously in a solvent, are fed in at the top end are particularly advantageous for the continuous anionic, adiabatic homopolymerization of styrene. In principle, however, all reactants may also be premixed immediately before entering the reaction apparatus, especially if it is intended to manage without a solvent. The entry temperature is advantageously from room temperature to 70° C., preferably from 30° to 65° C., but it is also possible to use a precooled solution at, for example, from 0° to 20° C. The outlet temperature of the polymer mixture at the end of the reaction depends essentially on the amount of solvent added. It is in any case above 100°C., preferably from 150° to 360° C. The apparatuses used should be designed in such a way that the pressure built up can reach up to about 25 bar. In the process described, products having a narrow molecular weight distribution are mainly obtained. In order to obtain a broader molecular weight distribution, the initiator can be divided up and one or more portions added in downstream tube sections. The monomer, too, can be added in portions to various tube sections.

The hydrocarbons usually used for anionic polymerization may be employed as solvents. Suitable solvents are aliphatic, cycloaliphatic or aromatic hydrocarbons- which are liquid under the reaction conditions and are preferably of 4 to 12 carbon atoms. Examples are cyclohexane, methylcyclohexane, toluene, ethylbenzene and xylene.

Suitable initiators for the polymerization are the known hydrocarbon compounds of lithium (RLi), where R is an aliphatic, cycloaliphatic, aromatic or aliphatic-aromatic hydrocarbon radical. The hydrocarbon radical may be of 1 to about 12 carbon atoms.

Examples of lithium hydrocarbons are methyllithium, ethyllithium, n- and sec-butyllithium, isopropyllithium, cyclohexyllithium and phenyllithium. n-Butyllithium and sec-butyllithium are particularly preferred.

In order to obtain products having high thermal stability, it is essential to terminate the living chain ends and to do so immediately after the monomer has been completely converted. Termination of the living chain ends comprises reacting the polymer, still capable of further reaction, with a proton-active substance, or a Lewis acid or treating it with a coupling agent.

Examples of proton-active substances and coupling agents are alcohols, water, epoxides, aldehydes, esters, anhydrides, organic acids and halogen compounds, eg. silicon tetrachloride.

Reaction zone II

In the reaction zone II, block copolymers of styrene and butadiene are prepared. Mixtures of such block copolymers with polybutadiene may also be obtained. The preapration of styrene/butadiene block copolymers is known per se. Suitable reactors are the same apparatuses as described above for reaction zone I, but the enthalpy of reaction (the heat of polymerization) is removed continuously so that a uniform temperature prevails. Highly isothermal operation is, however, not absolutely essential.

Tube reactors in which the heat of reaction is removed either by means of jacket cooling or by means of internal cooling tubes are particularly suitable. Typical of the invention is the fact that the preparation of the polydiene and/or block copolymer is in any case carried out in solution, in contrast to the reaction zone I. The final concentration of the polymer solution at the outlet of reaction zone II is in general not more than 60%, preferably not more than 50%.

The vinyl aromatics and solvents chosen may be the same compounds as described for reaction zone I.

All hydrocarbons having a conjugated C=C double bond may be used as dienes. Butadiene, dimethylbutadiene, 1-phenylbutadiene, isoprene and piperylene and mixtures of these compounds are particularly suitable.

It is possible to choose block copolymers having any desired structure. Thus, two-block copolymers, three-block copolymers, multiblock copolymers or star block copolymers may be prepared in the novel process, and the transition between the blocks may be both well defined and tapered. Block copolymers having block segments in which styrene and butadiene were randomly copolymerized are also particularly advantageous.

Star block copolymers are obtained in a known manner by coupling. The coupling center is formed by reacting the living anionic chain ends with a polyfunctional coupling agent. Examples of suitable compounds are described in U.S. Pat. Nos. 3,985,830, 3,280,084, 3,637,554 and 4,091,053. Epoxidized glycerides, such as epoxidized linseed oil or soybean oil, are preferably used; divinylbenzene is also suitable. Dichlorodialkylsilanes, dialdehydes, such as terephthalaldehyde, and esters, such as ethyl formate or ethyl benzoate, are particularly suitable for the dimerization.

The amount by weight of the diene in the total block copolymer is from 15 to 80% and the amount of styrene is accordingly from 85 to 20%, the percentages being based on the monomer combination styrene/butadiene. Butadiene/styrene block copolymers composed of from 25 to 60% of butadiene and from 75 to 40% of styrene are particularly preferred.

In order to prepare, for example, a star block copolymer comprising polystyrene and polybutadiene blocks, styrene, a solvent, such as cyclohexane, and initiator are fed, separately or in premixed form, to the top end of a tube reactor, while butadiene is metered in further downstream. The exact metering point of the butadiene depends on the polymerization rate of the styrene, which can be controlled by means of the polymerization temperature, the concentration of the styrene in the solvent and the residence time in the tube reactor.

In order to obtain sharply separated blocks, the styrene must be completely polymerized before butadiene is metered in. After the addition of butadiene, it too is allowed to polymerize completely. The living chain ends are then coupled with a conventional coupling agent, for example with silicon tetrachloride, divinylbenzene or a polyfunctional epoxide, by adding the coupling agent at a metering point further downstream. The exact metering point depends on the polymerization rate of the butadiene.

After the coupling, the living chain ends are terminated by means of a proton-active substance. The temperature for the isothermal polymerization is advantageously from 20° to 150° C., preferably from 30 ° to 120° C. Owing to the boiling point of the diene, the reaction is carried out at superatmospheric pressure. The pressures are in general from 2 to 25 bar. The reaction can be accelerated by adding Lewis bases. Preferred Lewis bases are polar aprotic compounds, such as ether and tertiary amines. Examples of particularly effective ethers are tetrahydrofuran and aliphatic polyethers, such as diethylene glycol dimethyl ether. Suitable tertiary amines are tributylamine and pyridine. The Lewis base is added to the nonpolar solvent in a small amount, for example from 0.5 to 5% by volume. Tetrahydrofuran in an amount of from 0.1 to 0.3% by volume is particularly preferred. Experience has shown that it is possible to manage with about 0.2% by volume in most cases.

In the mixing zone III, which may consist of any mixing apparatus, ie. both dynamic stirring units and static mixers, the polymer streams from zones I and II are mixed, and, if required, assistants such as lubricants, antistatic agents, antioxidants, mold release agents, etc. may be added.

The ratio of the flow rates depends on the desired properties of the molding material and is adjusted so that the rubber content, expressed by the polydiene content, is from 2 to 50, preferably from 4 to 25, % by weight.

The mixing temperature is from 100° to 300° C., preferably from 120° to 260° C., depending on the temperature of the individual stream introduced.

A noteworthy feature of the processes in the mixing zone is that the polymer streams are mixed at above the phase inversion point, ie. they are not homogeneously miscible and accordingly no phase inversion takes place; instead, the rubber-containing solution flocculates to a certain extent and the rubber is distributed in the continuous phase.

The polymer blend is then fed to a devolatilization zone and is freed from the solvent by the usual means. Owing to the relatively high temperature required there, the devolatilization zone also performs the function of producing sufficient crosslinking of the dispersed rubber particles; for this purpose, it may be advantageous to provide a relatively long residence time in the devolatilization zone, for example at from 220° to 290° C., and possibly also to add a suitable assistant. Inter alia, free radical initiators, such as peroxides, perketals or peresters or C-C labile compounds, such as tetramethyldiphenylethane or hexaphenylethane, are suitable.

EXAMPLE 1

Reaction zone I consists of a tube of V2A stainless steel having an internal diameter 14 mm and a length of 3000 mm.

The reaction zone II consists of a tube of this type which has an internal diameter of 44 mm and a length of 3300 mm which is equipped with a cooling jacket and is filled over its entire length with a static mixer of type SMX from Sulzer.

The mixing zone (III) consists of a tube of this type which has a diameter of 8 cm and a length of 40 cm and is likewise equipped with a static mixer.

The solvent used was distilled and was dried over alumina. Styrene was distilled and was dried over alumina. Butadiene was dried over a molecular sieve. 1,1-Diphenylethylene was distilled over n-butyllithium.

Unless stated otherwise, the amounts shown below are by weight.

A mixture of 70 parts of styrene with 30 parts of cyclohexane was metered in at the top of the reaction tube I at a rate of 6.35 l/h. 150 ml/h of a 1% strength solution of sec-butyllithium in cyclohexane were metered in separately.

After a short induction period, the temperautre at the tube outlet increased to 195° C. The resulting conversion was over 99.99%.

At the same time, 4.3 kg/h of a mixture of 3.72 parts of butadiene, 2.48 parts of styrene and 35.1 parts of cyclohexane and, separately therefrom, 240 ml/h of a 1% strength solution of butyllithium in cyclohexane were fed to the reaction tube II. The reaction temperature was 72° C. Under the stated conditions, butadiene polymerized first and, when it had been essentially completely consumed, styrene polymerized. A tapered butadiene/styrene block copolymer was obtained. The solids content was 15%.

An excess, based on the amount of initiator used, of carbon dioxide and water was added to the solutions emerging from the reaction zones I and II before they were fed to the mixing zone, without further heat exchange with the environment. At the end of the mixing zone, a 54% strength mixture of a dispersed rubber phase and homogeneous polystyrene phase was obtained. This mixture was at 140° C. and was devolatilized and worked up by conventional methods.

EXAMPLE 2

The experiment from Example 1 was repeated, 0.1% of a commercial stabilizer (Irganox 1076 from Ciba-Geigy AG) and 2% of liquid paraffin, based in each case on the amount of polymer in the mixture, also being added to the polymer streams from the reaction zones I and II on entry into the mixer.

EXAMPLE 3

A mixture of 80 parts of styrene and 20 parts of cyclohexane was metered at a rate of 8.3 l/h into reaction zone I. 240 ml/h of a 1% strength solution of sec-butyllithium in cyclohexane were fed in for initiation. The temperature at the end of the reaction tube reached 230° C.

An SBS block copolymer was prepared in reaction zone II. For this purpose, at the top end, 1.30 l/h of a mixture of 1.75 parts of styrene in 7.0 parts of cyclohexane and 160 ml/h of a 1% strength sec-butyllithium solution were metered in, and a mixture of 2.5 parts of butadiene and 0.75 part of styrene in 13.0 parts of cyclohexane was metered in downstream at a rate of 2.45 l/h. The internal temperature was kept at 65° C.

The polymer formed was aftertreated with isopropanol.

EXAMPLE 4

The experiment of Example 1 was repeated by using a mixture of styrene and 1,1-diphenylethylene in a ratio of 3:1 instead of styrene in reaction zone I and subsequently metering in downstream 3%, based on this mixture, of styrene.

Accordingly, the amount of styrene used in reaction zone II was also replaced by a mixture of styrene and 1,1-diphenylethylene in a ratio of 3:1, and once again 3% of styrene was subsequently metered in downstream.

The procedure was then continued as described under Example 1.

EXAMPLE 5

The experiment in Example 1 was repeated by dividing the amount of initiator used in reaction zone I in a ratio of 2:1 and metering in the larger amount at the top of the reaction tube and the smaller amount downstream.

We claim:

1. A process for continuous preparation of toughened molding materials based on polystyrenes, comprising, in a matrix of a styrene homopolymer, an elastomeric styrene-butadiene block copolymer, the proportion of butadiene in the styrene-butadiene block copolymer being from 15 to 80% by weight and in the molding materials a whole being from 2 to 50% by weight, which comprises:

producing a first polymer stream by subjecting styrene to anionic polymerization in a first reaction zone (I), without heat exchange with the environment and, if required, with the addition of a solvent, until complete conversion is achieved, and the living chain ends are terminated in a manner known per se;

producing a second polymer stream by subjecting, in a second reaction zone (II) operated parallel to the first reaction zone (I), styrene and butadiene to isothermal anionic polymerization with the use of a suitable solvent, likewise to complete conversion, to give an elastomeric block copolymer whose living chain ends are terminated with a proton-active substance either immediately or after appropriate coupling by means of a polyfunctional compound; and combining the two polymer streams in a mixing zone (III) and freeing the combined polymer streams from solvent and volatile components in a devolatilization zone.

2. A process as claimed in claim 1, wherein the ratio of the reactants from reaction zones I and II is chosen so that the molding material contains from 4 to 25% by weight of polybutadiene.

3. A process as claimed in claim 1, wherein blends of polybutadiene and styrene/butadiene block copolymer are prepared in reaction zone II.

4. A process as claimed in claim 1, wherein the reaction products from reaction zones I and II are mixed above the phase inversion point.

5. A process as claimed in claim 1, wherein a free radical initiator is added to the polymer blend before entry into the devolatilization zone.

6. The process of claim 1, which additionally comprises the step of fabricating the combined polymer streams exiting from the devolatilization zone into a film, sheet, or molding.

7. The process of claim 1, wherein styrene is subjected to anionic polymerization in the first reaction zone (I) at an entry temperature of from 30° to 65° C. to provide a first polymer stream having a temperature between 150° C. and 360° C.

8. A process for continuous preparation of toughened vinyl aromatic compounds, which comprises:

producing a first polymer stream having a temperature above 150° C. by subjecting, at an entry temperature of from 30° to 65° C., a vinyl aromatic compound to anionic polymerization in a first reaction zone (I), without heat exchange with the environment and, if required, with the addition of a solvent, until complete conversion is achieved, and the living chain ends are terminated in a manner known per se;

producing a second polymer stream by subjecting, in a second reaction zone (II) which is operated parallel to the first reaction zone (I), the vinyl aromatic compound and a diene to isothermal anionic polymerization with the use of a suitable solvent, likewise to complete conversion, to give an elastomeric block copolymer whose living chain ends are terminated with a proton-active substance either immediately or after appropriate coupling by means of a polyfunctional compound; and combining the two polymer streams in a mixing zone (III) and freeing the combined polymer streams from solvent and volatile components in a devolatilization zone.

* * * * *

UNITED STATES PATENT AND TRADEMARK OFFICE
CERTIFICATE OF CORRECTION

PATENT NO. : 5,795,938

DATED : August 18, 1998

INVENTOR(S) : KNOLL et al.

It is certified that error appears in the above-identified patent and that said Letters Patent is hereby corrected as shown below:

Col. 6, claim 1, line 44, "polystyrenes," should be --polystyrene,--.

Signed and Sealed this

Twenty-fourth Day of November, 1998

Attest:

BRUCE LEHMAN

Attesting Officer

Commissioner of Patents and Trademarks